(12) United States Patent
Chandra et al.

(10) Patent No.: US 9,165,305 B1
(45) Date of Patent: *Oct. 20, 2015

(54) GENERATING MODELS BASED ON USER BEHAVIOR

(75) Inventors: Tushar Chandra, Los Altos, CA (US); Tal Shaked, Mountain View, CA (US); Tomas Lloret Llinares, Mountain View, CA (US); Jim McFadden, San Francisco, CA (US); Andrew Tomkins, San Jose, CA (US); Saurabh Mathur, Sunnyvale, CA (US); Danny Wyatt, San Francisco, CA (US)

(73) Assignee: Google Inc., Mountain View, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/102,698

(22) Filed: May 6, 2011

Related U.S. Application Data

(60) Provisional application No. 61/424,636, filed on Dec. 18, 2010.

(51) Int. Cl.
*G06Q 30/02* (2012.01)
*G06F 17/30* (2006.01)
*G06N 5/00* (2006.01)

(52) U.S. Cl.
CPC ............... *G06Q 30/02* (2013.01); *G06F 17/30* (2013.01); *G06N 5/00* (2013.01)

(58) Field of Classification Search
CPC ................................. G06Q 30/02; G06F 17/30
USPC .......................................................... 706/12
See application file for complete search history.

(56) References Cited

U.S. PATENT DOCUMENTS

| | | |
|---|---|---|
| 6,130,938 A | 10/2000 | Erb |
| 6,192,119 B1 | 2/2001 | Wilson |
| 6,697,478 B1 | 2/2004 | Meldrum et al. |
| 6,754,322 B1 | 6/2004 | Bushnell |
| 7,003,515 B1 | 2/2006 | Glaser et al. |
| 7,106,848 B1 | 9/2006 | Barlow et al. |
| 7,366,990 B2 | 4/2008 | Pitroda |
| 7,401,025 B1 | 7/2008 | Lokitz |

(Continued)

FOREIGN PATENT DOCUMENTS

WO      WO02079984      10/2002

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Kakali Chaki
*Assistant Examiner* — Michael Zidanic
(74) *Attorney, Agent, or Firm* — Patent Law Works LLP

(57) ABSTRACT

A system and method for generating a model based on the user's interests and activities by receiving with a logging unit user activities from heterogeneous data sources, generating a log of user activities for a content item by joining the user activities for the content item, expanding attributes of the log by at least one of content and by the user to form an expanded log and generating a user model based on the expanded log. A feature extractor extracts features from content items and assigns weights to the features. A scoring engine receives the model and the content items with their associated weighted features and scores the content items based on the user model. The scoring engine generates a stream of content based on the scored content items.

20 Claims, 10 Drawing Sheets

(56) References Cited

U.S. PATENT DOCUMENTS

| | | | |
|---|---|---|---|
| 7,555,110 | B2 | 6/2009 | Dolan et al. |
| 7,610,287 | B1 | 10/2009 | Dean et al. |
| 7,742,468 | B2 | 6/2010 | Vagelos |
| 7,761,454 | B2 | 7/2010 | Smyth et al. |
| 7,827,110 | B1 | 11/2010 | Wieder |
| 7,962,482 | B2 | 6/2011 | Handman et al. |
| 8,055,655 | B1 | 11/2011 | He et al. |
| 8,091,032 | B2 | 1/2012 | Fischer |
| 2001/0042060 | A1 | 11/2001 | Rouse et al. |
| 2002/0137490 | A1 | 9/2002 | Gallant |
| 2002/0143874 | A1 | 10/2002 | Marquette et al. |
| 2002/0194076 | A1 | 12/2002 | Williams et al. |
| 2003/0061211 | A1 | 3/2003 | Shultz et al. |
| 2004/0258220 | A1 | 12/2004 | Levine et al. |
| 2004/0267740 | A1 | 12/2004 | Liu et al. |
| 2005/0038688 | A1 | 2/2005 | Collins et al. |
| 2005/0152521 | A1 | 7/2005 | Liljestrand |
| 2006/0020616 | A1 | 1/2006 | Hardy et al. |
| 2006/0026288 | A1 | 2/2006 | Acharya et al. |
| 2006/0041530 | A1 | 2/2006 | Milic-Frayling et al. |
| 2006/0074883 | A1 | 4/2006 | Teevan et al. |
| 2006/0077957 | A1 | 4/2006 | Reddy et al. |
| 2006/0136589 | A1 | 6/2006 | Konig et al. |
| 2006/0167857 | A1 | 7/2006 | Kraft et al. |
| 2006/0206604 | A1 | 9/2006 | O'Neil et al. |
| 2006/0212444 | A1 | 9/2006 | Handman et al. |
| 2006/0224509 | A1 | 10/2006 | Walker et al. |
| 2006/0242139 | A1 | 10/2006 | Butterfield et al. |
| 2006/0282336 | A1 | 12/2006 | Huang |
| 2007/0016553 | A1 | 1/2007 | Dumais et al. |
| 2007/0043742 | A1 | 2/2007 | Arguello et al. |
| 2007/0060099 | A1 | 3/2007 | Ramer et al. |
| 2007/0109616 | A1 | 5/2007 | Thompson |
| 2007/0127631 | A1 | 6/2007 | Difiglia |
| 2007/0143260 | A1 | 6/2007 | Markov et al. |
| 2007/0162424 | A1 | 7/2007 | Jeh et al. |
| 2007/0171898 | A1 | 7/2007 | Salva |
| 2007/0173236 | A1 | 7/2007 | Vishwanathan et al. |
| 2007/0219754 | A1 | 9/2007 | D'Ambrosio |
| 2007/0242626 | A1 | 10/2007 | Altberg et al. |
| 2007/0244884 | A1 | 10/2007 | Yang |
| 2007/0248077 | A1 | 10/2007 | Mahle, Jr. et al. |
| 2007/0265905 | A1* | 11/2007 | Lazier ............................ 705/10 |
| 2008/0004989 | A1* | 1/2008 | Yi ................................ 705/27 |
| 2008/0040474 | A1 | 2/2008 | Zuckerberg et al. |
| 2008/0056475 | A1 | 3/2008 | Brannick et al. |
| 2008/0059308 | A1 | 3/2008 | Gerken |
| 2008/0059460 | A1 | 3/2008 | Lunenfeld |
| 2008/0077462 | A1 | 3/2008 | Patel et al. |
| 2008/0147450 | A1 | 6/2008 | Mortimore |
| 2008/0192656 | A1 | 8/2008 | Vagelos |
| 2008/0208841 | A1* | 8/2008 | Zeng et al. ........................ 707/5 |
| 2008/0209320 | A1* | 8/2008 | Mawhinney et al. ......... 715/700 |
| 2008/0255977 | A1 | 10/2008 | Altberg et al. |
| 2009/0113483 | A1* | 4/2009 | Thampy et al. ............... 715/234 |
| 2009/0125403 | A1 | 5/2009 | Li |
| 2009/0164408 | A1 | 6/2009 | Grigorik et al. |
| 2009/0210321 | A1 | 8/2009 | Rapp |
| 2009/0222481 | A1 | 9/2009 | Fisher et al. |
| 2010/0030717 | A1* | 2/2010 | Agarwal et al. ................. 706/46 |
| 2010/0042928 | A1 | 2/2010 | Rinearson |
| 2010/0131527 | A1 | 5/2010 | Wohlert |
| 2010/0138423 | A1 | 6/2010 | Moore et al. |
| 2010/0191799 | A1 | 7/2010 | Fiedorowicz et al. |
| 2010/0287368 | A1 | 11/2010 | Shuster et al. |
| 2010/0299360 | A1* | 11/2010 | Yi ................................ 707/776 |
| 2011/0041076 | A1 | 2/2011 | Sinn et al. |
| 2011/0098156 | A1 | 4/2011 | Ng et al. |
| 2011/0154183 | A1 | 6/2011 | Burns et al. |
| 2011/0161323 | A1* | 6/2011 | Hagiwara ...................... 707/737 |
| 2011/0161336 | A1* | 6/2011 | Shiga et al. ................... 707/758 |
| 2011/0167054 | A1* | 7/2011 | Bailey et al. .................. 707/710 |
| 2011/0178995 | A1 | 7/2011 | Suchter et al. |
| 2011/0196933 | A1 | 8/2011 | Jackson et al. |
| 2011/0225170 | A1* | 9/2011 | Obasanjo et al. ............. 707/748 |
| 2011/0246907 | A1 | 10/2011 | Wang et al. |
| 2012/0054190 | A1 | 3/2012 | Peters |
| 2012/0084291 | A1 | 4/2012 | Chung et al. |
| 2012/0102410 | A1* | 4/2012 | Gewecke et al. ............. 715/738 |
| 2012/0113121 | A1 | 5/2012 | Luo |
| 2012/0144328 | A1 | 6/2012 | O'Byrne |
| 2012/0158753 | A1 | 6/2012 | He et al. |
| 2013/0204873 | A1 | 8/2013 | Vandermolen et al. |
| 2013/0247212 | A1 | 9/2013 | Muriello et al. |
| 2014/0019551 | A1 | 1/2014 | Zuckerberg et al. |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, May 13, 2011, 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

(56) References Cited

OTHER PUBLICATIONS

Murchu et al., "Online Social and Business Networking Communities," Digital Enterprise Research Institute DERI Technical Report, National University of Ireland, Aug. 8, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twigger, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

\* cited by examiner

GENERATING MODELS BASED ON USER BEHAVIOR

CROSS REFERENCE TO RELATED APPLICATIONS

This application claims priority under 35 USC §119(e) to U.S. Application No. 61/424,636, entitled "Scoring Stream Items with Models Based on User Interests" filed Dec. 18, 2010, the entirety of which is herein incorporated by reference.

BACKGROUND

The specification relates to a system and method for generating a model based on user activities and for generating a stream of content based on the model. In particular, the specification relates to logging a user's activities, categorizing content and predicting a user's reaction to new content.

The Internet contains a vast amount of information categorized in a variety of different ways. Users are interested in very specific types of information and they want that information presented quickly and accurately. Some social networks attempt to provide a user with new content by analyzing a user's behavior and making suggestions. For example, a DVD rental service suggests new movies based on the user's history of watching thrillers or a specific actor. These suggestions may be helpful for movies, but the DVD rental service lacks sufficient information to predict a user's interest in other areas, such as news items and status updates on a social network.

SUMMARY OF THE INVENTION

In some examples, a generated model predicts user reactions to a stream of content. In one embodiment, a logging unit receives user activities from heterogeneous data sources and generates a log of the user activities. The user activities include endorsing (e.g. liking) a content item, disliking a content item, commenting on a content item, sharing a content item, clicking on a content item, hovering on a content item, retrieving a content item and saving a content item. The heterogeneous data sources include a search history, a blog post, a news article, a news feed, a video, a map, a message, an email message, an instant message, a buzz, a text-based post, a phone call and an activity on site.

In some embodiments, a model generation engine is coupled to the logging unit and receives one or more logs from the logging unit. The model generation engine joins the user activities for each content item, expands attributes of the log by content and by the user and generates a model based on the expanded log. To expand attributes of the log by content, the model generation engine identifies the content item in the log and retrieves keywords and weights associated with the content item. To expand attributes of the log by the user, the model generation engine identifies the content item in the log, retrieves features and weights associated with the content item, identifies characteristics of the user and associates the characteristics of the user with the features and weights associated with the content item. The model generation engine performs these steps for each content item.

In some examples, a feature extractor retrieves content items from heterogeneous data sources. The feature extractor extracts features from the content items, determines the relevancy of the features and applies a weight to the features based on the relevancy to form weighted features. The content items and the associated weighted features are stored in memory or a data storage server.

At least according to one embodiment, a scoring engine is coupled to the model generation engine and the memory or data storage server. The scoring engine receives the model and the content items with their associated features. The scoring engine compares the content items to the model and scores the items. The scores predict a likelihood of the user to react positively or negatively to the content item. For example, the score predicts whether the user is likely to click the content item, hide the content item, comment on the content item, pass, click, approve of the content item, reshare the content item, remove the content item from the stream of content, retrieve a content item and save a content item. The scoring engine generates a stream of content based on the scores of the content items.

In one embodiment, the specification relates to a computer program product comprising a computer useable medium including a computer readable program for receiving user activities from heterogeneous data sources, generating a log of user activities for a content item by joining the user activities for the content item, expanding attributes of the log by at least one of content and by the user to form an expanded log and generating a model based on the expanded log.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1A:
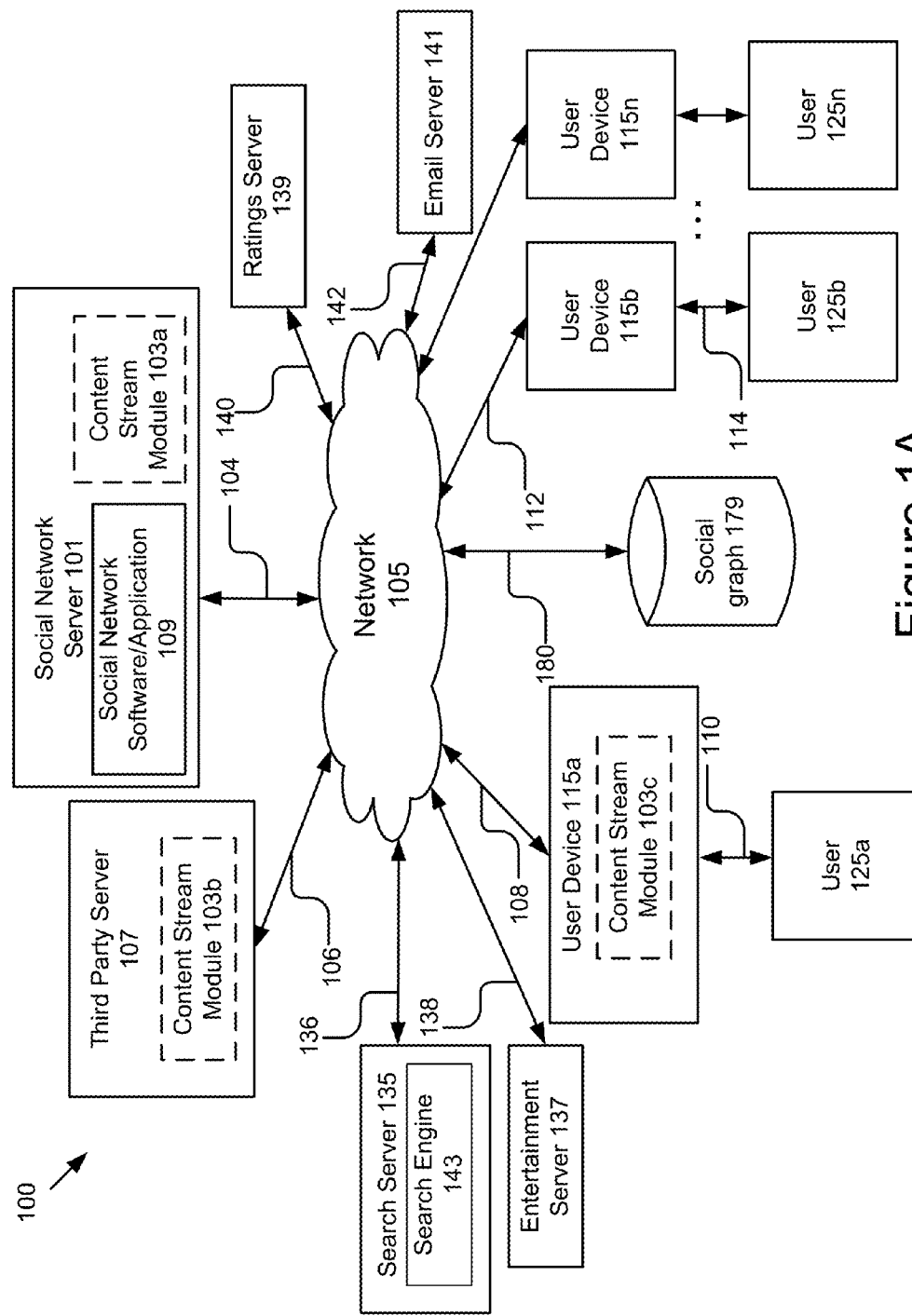
FIG. 1A is a high-level block diagram illustrating one embodiment of a system for generating a stream of content.

A system and method for generating a model and a stream of content is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1A illustrates a block diagram of a system 100 for generating a stream of content based on a predictive model of a user according to one embodiment. The system 100 generates a stream of content including user devices 115a, 115b that are accessed by users 125a, 125b, a social network server 101 and a third party server 107. In the illustrated embodiment, these entities are communicatively coupled via a network 105. Although only two devices are illustrated, persons of ordinary skill in the art will recognize that any number of user devices 115n are available to any number of users 125n.

The user devices 115a, 115b in FIG. 1A are used by way of example. While FIG. 1A illustrates two devices, the embodiment applies to any system architecture having one or more user devices. Furthermore, while only one network 105 is coupled to the user devices, 115a, 115b, the social network server 101 and the third party server 107, in practice any number of networks 105 can be connected to the entities. Furthermore, while only one third party server 107 is shown, the system 100 could include one or more third party servers 107.

In one embodiment, the content stream module 103a is operable on the social network server 101, which is coupled to the network via signal line 104. The social network server 101 also contains a social network software/application 109. Although only one social network server 101 is shown, persons of ordinary skill in the art will recognize that multiple servers may be present. A social network is any type of social structure where the users are connected by a common feature, for example, Orkut. The common feature includes friendship, family, work, an interest, etc. The common features are provided by one or more social networking systems, such as those included in the system 100, including explicitly-defined relationships and relationships implied by social connections with other online users, where the relationships form a social graph. In some examples, the social graph can reflect a mapping of these users and how they are related.

In another embodiment, the content stream module 103b is stored on a third party server 107, which is connected to the network via signal line 106. In yet another embodiment, the content stream module 103c is stored on a user device 115a, which is connected to the network via signal line 108. The user 125a interacts with the user device 115a via signal line 110. For example, the content stream module 103c generates a user interface as an application or on a browser. Similarly, the user device 115b is coupled to the network 105 via signal line 112 and the user 125b interacts with the user device 115b via signal line 114. Persons of ordinary skill in the art will recognize that the content stream module 103 can be stored in any combination on the devices and servers.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The content stream module 103 retrieves data for generating a content stream from heterogeneous data sources. In one embodiment, the content stream module retrieves data from a third party server 107, a social network server 101, user devices 115a, 115b . . . 115n, a search server 135 that is coupled to the network 105 via signal line 136, an entertainment server 137 that is coupled to the network 105 via signal line 138, a ratings server 139 (e.g. for Google Hotpot or other ratings websites) that is coupled to the network 105 via signal line 140, an email server 141 that is coupled to the network 105 via signal line 142 and a social graph 179 that is coupled to the network 105 via signal line 180. In one embodiment, the search server 135 includes a search engine 143 for retrieving results that match search terms from the Internet. In one embodiment, the search engine 143 is powered by Google®. The content stream module 103 generates a model based on the data from the heterogeneous data sources, retrieves candidate content items from heterogeneous data sources, compares the candidate content items to the model and generates a stream of content.

Content Stream Module 103

Figure 1B:
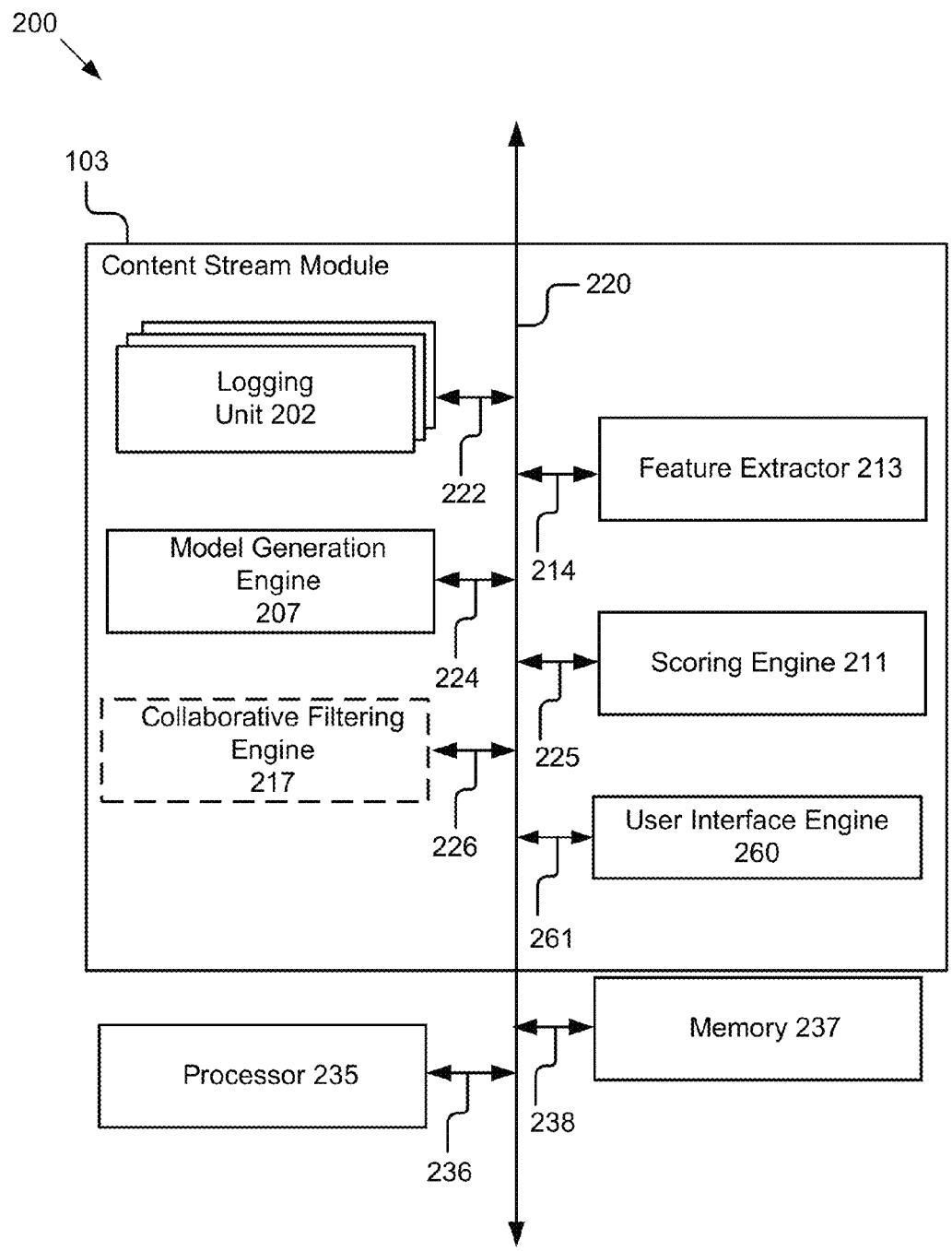
FIG. 1B is a block diagram illustrating one embodiment of a content stream module.

Referring now to FIG. 1B, the content stream module 103 is shown in more detail. FIG. 1B is a block diagram of a computing device 200 that includes the content stream module 103, a memory 237 and a processor 235. In one embodiment, the computing 200 device is a social network server 101. In another embodiment, the computing device 200 is a third party server 107. In yet another embodiment, the computing device 200 is a user device 115a.

Figure 2:
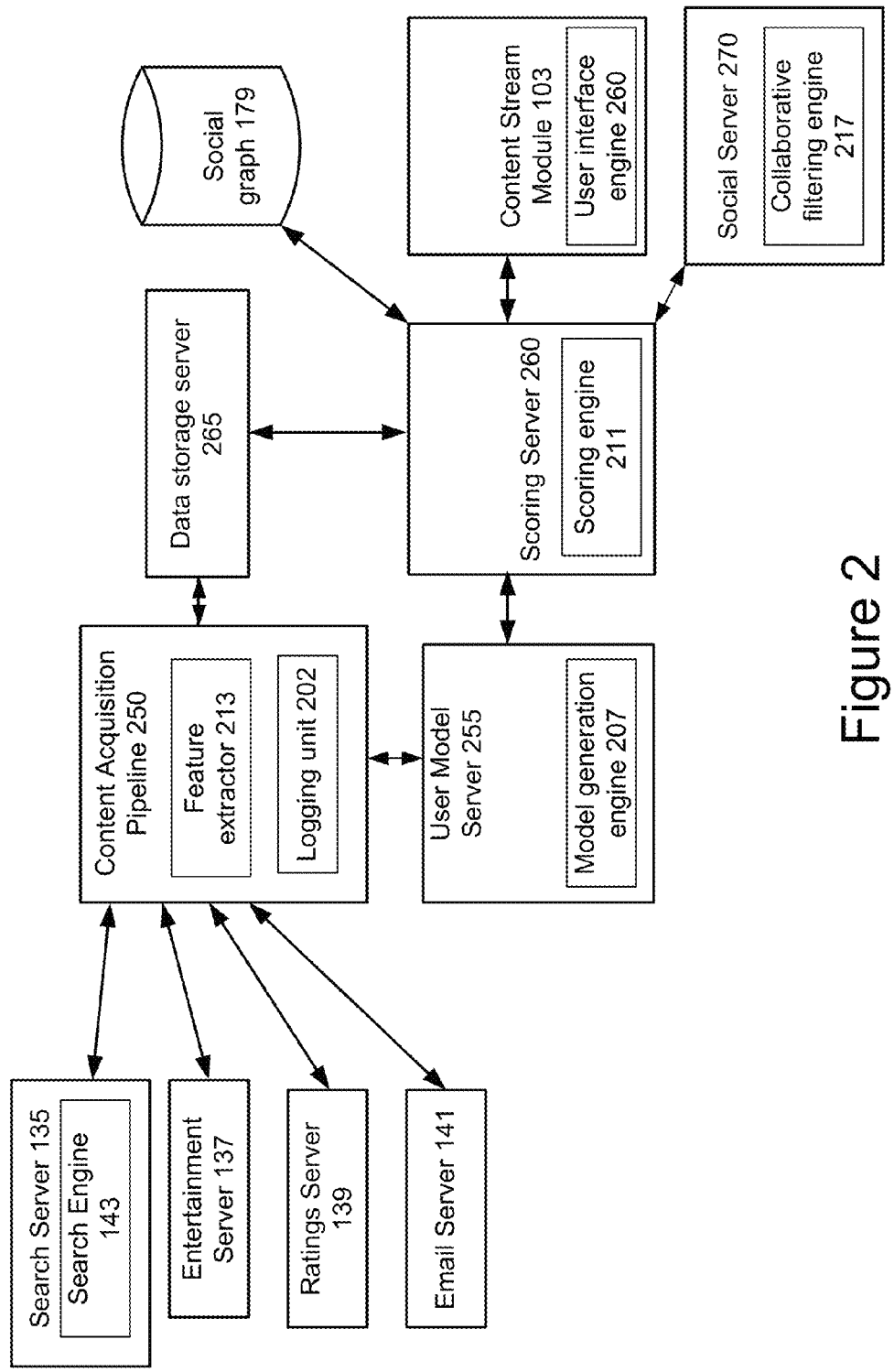
FIG. 2 is a high-level block diagram illustrating another embodiment of a system for generating a stream of content.

The processor 235 comprises an arithmetic logic unit, a microprocessor, a general purpose controller or some other processor array to perform computations and provide electronic display signals to a display device. The processor 235 is coupled to the bus 220 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In one embodiment, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

In one embodiment, the content stream module 103 comprises a logging unit 202, a model generation engine 207, a feature extractor 213, a scoring engine 211, optionally, a collaborative filtering engine 217 and a user interface engine 260.

The logging unit 202 is software including routines for receiving information about a user's interests and social connection (for example, subject to a user opting in to data collection) and for generating and storing a log. In one embodiment, the logging unit 202 is a set of instructions executable by the processor 235 to provide the functionality described below for generating the log. In another embodiment, the logging unit 202 is stored in the memory 237 of the computing device 200 and is accessible and executable by the processor 235. In either embodiment, the logging unit 202 is adapted for cooperation and communication with the processor 235 and other components of the computing device 200 via signal line 222.

The logging unit 202 receives information about users from user input and/or prior actions of a user across a range of heterogeneous data sources including search (such as web, video, news, maps, alerts), entertainment (such as news, video, a personalized homepage, blogs, a reader, gadget subscriptions), social activity (such as interactions through email, profile information, text messaging such as short message service (SMS), microblogs, geographical locations, commenting, liking, sharing, disliking, clicking, hovering, retrieving, saving, etc. on a post, a photo, etc. and other social networking information) and activity on third-party sites (such as websites that provide ratings, reviews and social networks where users indicate that they approve of content). This information is derived, for example, from a user's search history, browsing history, social network history and other interactions with the Internet. The logging unit 202 generates a log from the information. The log contains the received information and a designation of the source of the information.

In some examples, log information can be collected upon user consent. In some implementations, a user is prompted to explicitly allow data collection. Further, the user may opt in/out of participating in such data collection activities. Furthermore, the collected data can be anonymized prior to performing the analysis to obtain the various statistical patterns described above.

In one embodiment, there are multiple logging units 202 that each receive data from a different heterogeneous data source. In another embodiment, the data is received by the same logging unit 202. The logging unit 202 transmits the log to memory 237 for storage. In one embodiment, the memory 237 partitions the logs from each heterogeneous data source in a separate data storage location. In another embodiment, the data from heterogeneous data sources is stored in the same location in the memory 237. In yet another embodiment, the memory 237 partitions the model and the stream of content into separate storage locations as well. The logging unit 202 updates the information in real time as new data becomes available.

The model generation engine 207 is software including routines for receiving the log from the logging unit 202 or retrieving the log from the memory 237 and generating a model based on the log. In one embodiment, the model generation engine 207 is a set of instructions executable by the processor 235 to provide the functionality described below for generating the model. In another embodiment, the model generation engine 207 is stored in the memory 237 of the computing device 200 and is accessible and executable by the processor 235. In a third embodiment, the model generation engine 207 is adapted for cooperation and communication with the processor 235 and other components of the computing device 200 via signal line 224. In yet another embodiment, the model generation engine 207 is a specialized computer, is implemented in hardware (e.g., via FPGAs/ASICs) or runs on a graphics card.

The model generation engine 207 receives user information from the logging unit 202, analyzes the user information and generates models for each type of user behavior that predict how the user will react to new information based on the historical data. In another embodiment, a single model predicts multiple types of behavior. The model consists of various types of relevance of items to users, along with floating point values to indicate the extent to which the relevance holds. Examples include endorsing a source, a primary location, and a list of interests. The interests are generated from explicit information and inferred information. Explicit information is derived, for example, from a user's list of interests on a social network or indicating that they liked a particular content item. Inferred information takes into account a user's activities.

The model generation engine 207 also incorporates into the model several pieces of global meta-information about the user's consumption patterns including how frequently the user consumes the stream of content and global statistics on how likely the user is to engage in a positive reaction, such as reshare various types of items or how likely the user is to engage in a negative reaction, such as removing or hiding the content item from the stream of content. Lastly, the model includes a sequence of weights and multipliers that are used to make predictions about the user's likelihood of clicking on, sharing, saving, retrieving or otherwise engaging with stream items.

The model generation engine 207 generates the model from the logs across the heterogeneous data sources. In one embodiment, the model generation engine 207 builds extensions to the model that employ the patterns of behavior of other users. In one implementation, the model predicts the user's behavior based on the reaction of similar users.

In one embodiment, the model generation engine 207 generates a model in response to a user opting in with a specific piece of information, for example, allowing the model generation engine 207 to include the user's search history into the model. Alternatively, the model generation engine 207 receives periodic updates (one hour, one day, one week, etc.) from the heterogeneous data sources and in turn updates the model. The model generation engine 207 transmits the model to memory 237 for storage.

The feature extractor 213 is software including routines for categorizing content items. In one embodiment, the feature extractor 213 is a set of instructions executable by the processor 235 to provide the functionality described below for categorizing content. In another embodiment, the feature extractor 213 is stored in the memory 237 of the computing device 200 and is accessible and executable by the processor 235. In either embodiment, the feature extractor 213 is adapted for cooperation and communication with the processor 235 and other components of the computing device 200 via signal line 214. In yet another embodiment, the feature extractor 213 is a specialized computer, is implemented in hardware (e.g., via FPGAs/ASICs) or runs on a graphics card.

The feature extractor 213 retrieves content items from a variety of heterogeneous data sources, such as a search server 135, an entertainment server 137, a third party server 107, a social network server 101, a ratings server 139 and an email server 141. The feature extractor 213 extracts features from the content items, determines the relevancy of the features and assigns a weighted score to the features.

Relevancy takes into account factors such as the location of the words, the number of times the word is mentioned, whether the word is topical, etc. For example, a word in the header is more likely to include the subject matter of the article than a word in the middle of the article.

Features include topics, geographic location, people described in the article, etc. The feature extractor 213 determines whether a feature is topical based on the context of the word in the article. For example, in an article about golf, rain is not topical. In an article about drought, rain is topical. The feature extractor 213 also uses features to determine the geographic location discussed in the content item. Thus, an article that mentions multiple locations has different weights assigned to each location. For example, an article that starts out "San Francisco, Calif." will have a higher weight than mentioning Dover, N.H. in the sixth paragraph. The feature extractor 213 transmits the feature and weights to the memory 237 for storage along with the content item.

The scoring engine 211 is software including routines for generating a stream of content from candidate content items. In one embodiment, the scoring engine 211 is a set of instructions executable by the processor 235 to provide the functionality described below for generating a stream of content. In another embodiment, the scoring engine 211 is stored in the memory 237 of the computing device 200 and is accessible and executable by the processor 235. In either embodiment, the scoring engine 211 is adapted for cooperation and communication with the processor 235 and other components of the computing device 200 via signal line 225. In yet another embodiment, the scoring engine 211 is a specialized computer, is implemented in hardware (e.g., via FPGAs/ASICs) or runs on a graphics card.

In one embodiment, the scoring engine 211 queries the memory 237 for candidate content items and their associated features and weights as extracted by the feature extractor 213. The scoring engine 211 receives the candidate content items and compares the candidate content items to the model to predict whether the user would find the candidate content items interesting. Specifically, the scoring engine 211 predicts whether the user would have a positive or negative outcome to the candidate content item, such as pass, click, approving of the item, resharing the item, commenting the item, removing the item, hiding the item, retrieving the item, saving the item, etc.

The query is derived from the user's interests, social connections and, in one embodiment, recent search terms input by the user. In one embodiment, the scoring engine 211 also uses contextual clues to further narrow the number of candidate content items. For example, the scoring engine 211 queries the memory 237 for items related to skiing because it is an explicit interest, Jeeps because it is a recent search term and Jeeps and skiing in Montana because the user's IP address is in Montana.

In one embodiment, the scoring engine 211 first performs the query and then compares the results to the model to determine whether the user would find them interesting. In another embodiment, these steps are performed simultaneously. In yet another embodiment, the scoring engine 211 compares candidate content items to the model and then filters the results according to the subject matter of the queries.

The scoring engine 211 determines interestingness based on social relevance and an interest match of the item to the user. Social relevance refers to whether a content item is new and determined to be valuable by the user's friends on a social network or people of a similar demographic to the user. For example, if the user is 13 and enjoys pop music, the user might be interested in content items about a new artist. The interest match of the item to the user is determined based on similarity of the content item to the model.

Interestingness is measured by calculating a score for each candidate content item. In one embodiment, the scoring engine 211 incorporates historical interaction feeds into the scoring. In another embodiment, the candidate items are not displayed unless their candidate scores exceed a certain threshold. Once the scores are calculated and thresholds are exceeded, the scoring engine 211 generates a stream of content that is ordered according to the candidate content item scores. In one embodiment, the scoring engine 211 generates a user interface that includes the stream of content. The user interface is displayed as part of another application, such as a social network, or as its own standalone application.

In one embodiment, the scoring engine 211 also generates an explanation for each item in the stream of content. The explanation is presented in a variety of ways including a tag that contains the subject matter of the content item (skiing) or a more detailed explanation (your friends enjoyed this article). Other explanations include that the content item matches a specific user interest or is similar to other content items that the user has liked in the past. The user's reaction to the explanation is used to further refine the model. This process is discussed in more detail below in connection with FIG. 3C, which illustrates a more detailed block diagram of the scoring engine 211.

Turning back to FIG. 1B, the collaborative filtering engine 217 is software including routines for generating additional candidate content items through collaborative filtering and transmitting the additional candidate content items to the scoring engine 211 that were derived from collaborative filtering. In one embodiment, the collaborative filtering engine 217 is a set of instructions executable by the processor 235 to provide the functionality described below for generating additional candidate content items. In another embodiment, the collaborative filtering engine 217 is stored in the memory 237 of the computing device 200 and is accessible and executable by the processor 235. In either embodiment, the collaborative filtering engine 217 is adapted for cooperation and communication with the processor 235 and other components of the computing device via signal line 226. In yet another embodiment, the collaborative filtering engine 217 is a specialized computer, is implemented in hardware (e.g., via FPGAs/ASICs) or runs on a graphics card.

The collaborative filtering engine 217 retrieves candidate content items that are socially relevant from a stream of content derived from people with whom the user has a relationship and transmits the candidate content items to the scoring engine 211. For example, the stream of content is derived from friends in a social network or people that the user frequently emails. These relationships are stored in the social graph 179. The more important that the person appears to be to the user, the more likely that the user will be interested in the content item. Thus, in one embodiment, the collaborative filtering engine 217 pre-scores the candidate content item by applying a weight to candidate content items based on the social relationship of the user to the friend. For example, users that are friends receive higher weights than candidate content items from second generation friends of the user (i.e. a friend of a friend).

In another embodiment, the collaborative filtering engine 217 selects candidate items based on shared similarities between users. For example, if the user has children, the collaborative filtering engine 217 selects candidate content items from other users that also have children.

The collaborative filtering engine 217 increases the weights applied to candidate content items from friends when the user positively responds to the items. For example, if the user comments on the item or indicates that the user found the item interesting, the collaborative filtering engine 217 increase the weight so that more candidate content items from the friend become part of the stream of content.

The user interface engine 260 is software including routines for generating a user interface that displays the stream of content, receives user feedback and allows the user to add or remove explicit interests. In one embodiment, the user interface engine 260 is a set of instructions executable by the processor 235 to provide the functionality described below for displaying a stream of content. In another embodiment, the user interface engine 260 is stored in the memory 237 of the computing device 200 and is accessible and executable by the processor 235. In either embodiment, the user interface engine 260 is adapted for cooperation and communication with the processor 235 and other components of the computing device 200 via signal line 261. In yet another embodiment, the user interface engine 260 is a specialized computer, is implemented in hardware (e.g., via FPGAs/ASICs) or runs on a graphics card.

Alternate Embodiment of the System

FIG. 2 is a high-level block diagram illustrating another embodiment of a system for generating a stream of content. In this embodiment, the components of the content stream module 103 are divided among various servers so that the information is efficiently processed. The system includes a search server 135, an entertainment server 137, a ratings server 139, an email server 141, a content acquisition pipeline 250, a data storage server 265, a model server 255, a scoring server 260, a social graph 179, a social server 270 and a content stream module 103.

Some heterogeneous data sources (search server 135, entertainment server 137, ratings server 139 and email server 141) are crawled by a content acquisition pipeline 250 or are directly transmitted to the content acquisition pipeline 250.

The content acquisition pipeline 250 includes a feature extractor 213 and a logging unit 202. The feature extractor 213 analyzes content items from the heterogeneous data sources and identifies different features in the content. The logging unit 202 annotates the content items with specific tags, such as features identified by the feature extractor 213 and a global score assigned by the scoring engine 211. Once the content items are annotated, the logging unit 202 transmits the data to the data storage server 265. The data storage server 265 indexes the features of each content item. In one embodiment, the content items are organized according to an identification format (SourceType#UniqueItemID, for example, "YOUTUBE#video_id" and "NEWS#doc_id"), an item static feature column that holds an item's static features (title, content, content classification, etc.), an item dynamic feature column that holds an item's dynamic features (global_score, number of clicks, number of following, etc.), a source (src) static feature column where the source is a publisher of an item (newspaper source, video uploading in YouTube, etc.), a src dynamic feature column holds the source's dynamic features, a content column holds activities that were used to create activities and a scoring feature holds a data structure that is used for user scoring.

In one embodiment, the data storage server 265 dynamically phases out the content items. For example, news items expire after 24 hours, videos expire after 48 hours and feeds are kept for 24 hours or only the 10 most recent items, whichever is larger.

The data storage server 265 also transmits the content items to the scoring server 260 for a global user ranking. The global scores are transmitted from the scoring server 260 back to the data storage server 265, which stores the global scores in association with the content items. The global scores are helpful for organizing the content items in the data storage server 265 according to the more popular items.

Turning now to the model server 255, the model server 255 receives the user activity from the logging unit 202 or the data storage server 265. The model generation engine 207 generates the model based on user input and/or prior actions. In one example, the model server 255 generates the model each time the scoring server 260 requests the model. The model server 255 transmits a model to the scoring server 260 periodically or upon request.

In one embodiment, the scoring server 260 requests the model responsive to receiving a request for a stream of content from the content stream module 103. The scoring server 260 receives the model from the model server 255. The scoring server 260 requests and receives user candidates from the social graph 179. The scoring server 260 requests and receives candidate content items from the data storage server 265. The scoring server 260 requests and receives candidate content items from the social server 270. The candidate content items from the social server 270 are pre-scored and, in one embodiment, the unread candidate content items are saved to a cache on the social server 270. These items are saved to a cache because the quantity of social updates can be large enough that performing the scoring during write time enables faster reads.

The scoring engine 211 compares the candidate content items to the model and scores the candidate content items. In the case of candidate content items from the social server 270, the engine 211 receives the candidate content items from the social server 270, compares the candidate content items to the model and rescores the candidate content items according to the model. The scoring engine 211 generates a stream of content based on the scored candidate content items and transmits the stream of content to the content stream module 103.

The content stream module 103 includes a user interface engine 260 that receives the stream of content from the scoring server 260 and displays it in a user interface. In addition to displaying the stream of content, the user interface provides the user with icons for changing the settings and user interests. The icons will be explained in greater detail below with regard to FIG. 4.

Model Generation Engine 207

Figure 3A:
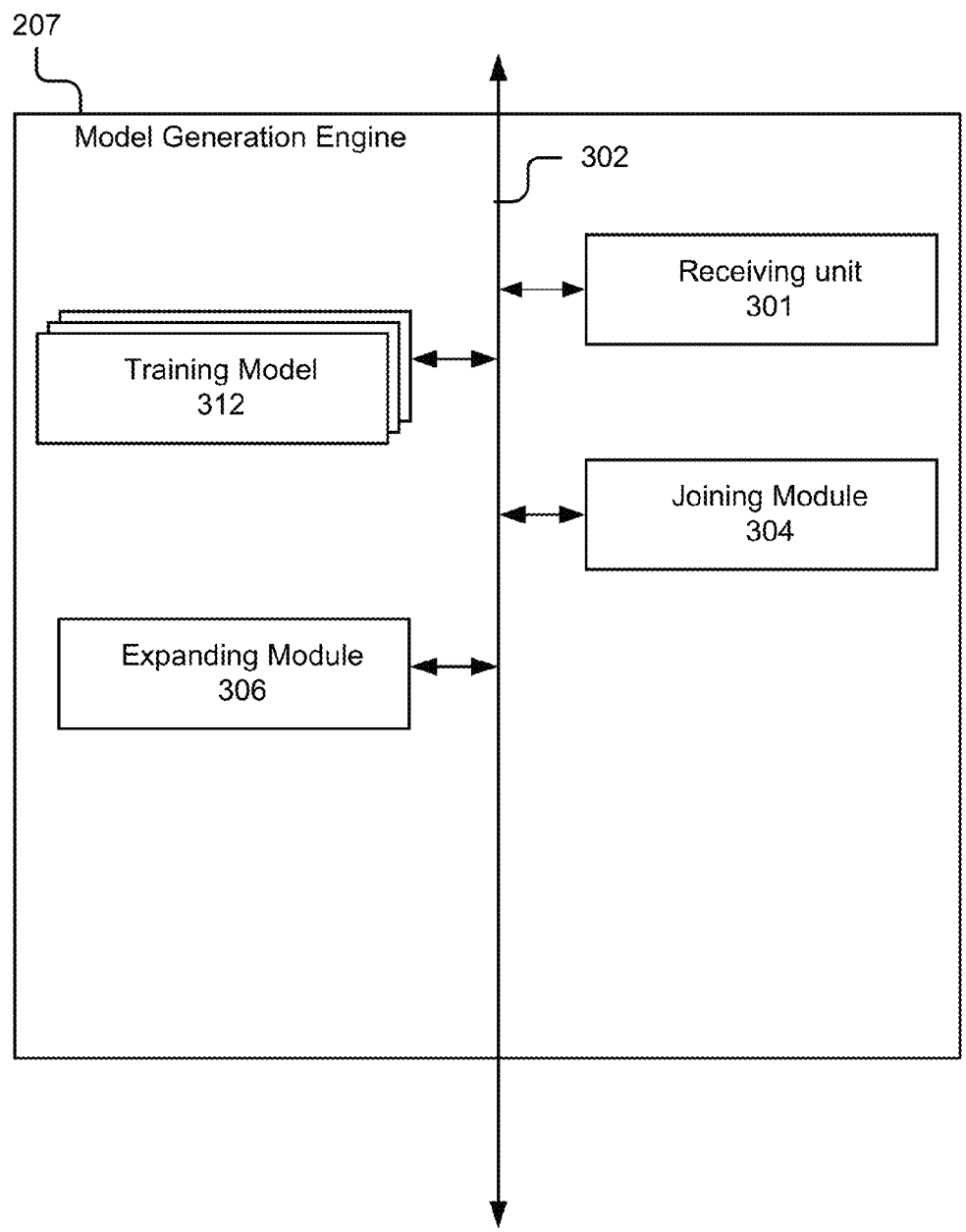
FIG. 3A is a block diagram of one embodiment of the model generation engine in more detail.
Figure 3B:
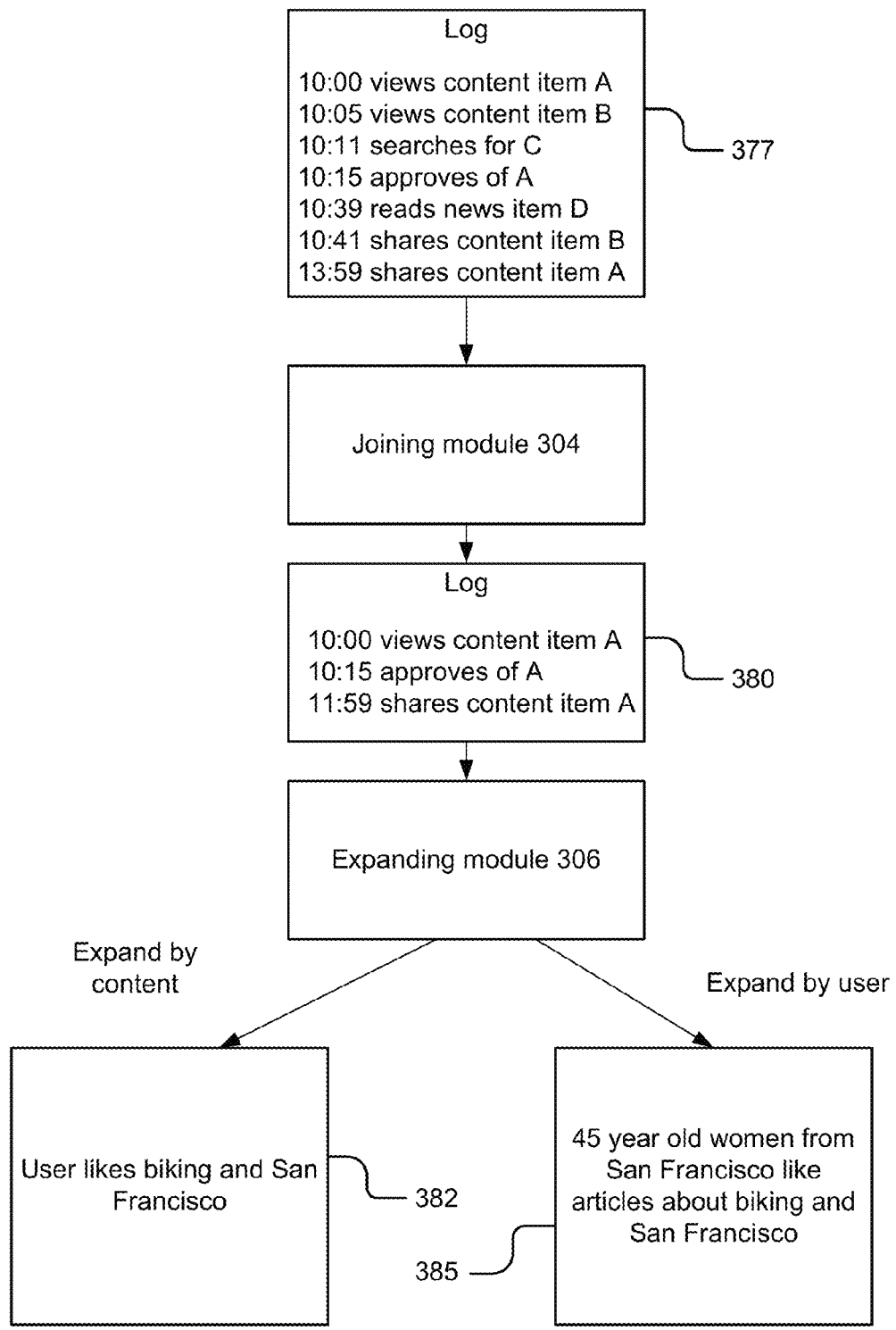
FIG. 3B is a block diagram of the flow of data through the model generation engine.

Referring now to FIG. 3A, in one embodiment the model generation engine 207 comprises a receiving unit 301, a joining module 304, an expanding module 306 and a training model 312 that are each coupled to signal line 302. The receiving unit 301 receives the logs from the logging unit 202. The logs contain unmodified information that was collected by the logging unit. FIG. 3B illustrates an example of a log 377 of user activity that is received by the joining module 304. In this example, the user viewed content item A at 10:00 am, he viewed content item B at 10:05 am, he searches for C at 10:11 am, he approved of A at 10:15 am, he read news item D at 10:39 am, he shared content item B at 10:41 am with friends and he shared content item A with friends at 1:59 pm.

The joining module 304 joins the actions for each content item. This example is focused on content item A. The joining module 304 joins all activities related to content item A and transmits a log 380 of joined activities for item A to the expanding module 306. The expanding module 306 expands attributes of the log by content and by user. The joining module 304 receives updates on a periodic basis, such as every hour. This keeps the content current and helps track feedback including a user's reactions to content that was server to the user based on predictions made by the training model 312.

To expand attributes of the log by content, the expanding module 306 retrieves the features and weights associated with the content item from the data storage server 265 or memory 237. The expanding module 306 then connects the user with the features and transmits this information to the training module 312. In the example illustrated in FIG. 3B, expanding attributes of the log by content results in output 382 that associates the user with biking and San Francisco because content item A was about biking in San Francisco. Persons of ordinary skill in the art will recognize that this is a simplified description of the model generation engine 207 and that many more features are recognized by the model generation engine 207.

In a more complicated example, the expanding module 306 retrieves the user's response to various classes of content items and aggregates the responses for each level of features. For example, the user's passes, clicks, approvals, comments, hiding, retrieving, saving, etc. are aggregated for all videos, all feed items, all news stories, all items about a particular artist, all items from an economist's blog, all popular items, all items shown to the user because a particular module suggested the items, etc.

To expand attributes of the log by a user, the expanding module 306 retrieves profile data about the user, such as gender, age, specified interests, etc. The expanding module 306 then associates the features of the content item with the demographics of the user to make a broader generalization. In the example illustrated in FIG. 3B, expanding attributes of the log by user results in output 385 that 45 year old women from San Francisco like articles about biking in San Francisco.

The outputs 382, 385 are transmitted to the training model 312, which creates a model for the user by assigning weights to each activity and predicting user behavior based on the features of the content items. In one embodiment, the training model 312 uses logistic regression to predict the probability of a user's reaction to a content item.

In one embodiment, each activity has its own training model 312. For example, there is a separate training model 312 for indicating approval of a content item, commenting, disliking an item, following a content item, sharing an item, hovering over an item, etc. In one embodiment, the model includes general user information to obtain an average reaction. All global information is anonymized prior to incorporating it into a database. The user information is more useful, however, because it establishes a particular user's reactions to things. For example, user A may react more positively to all content items than user B, such that user A receives a higher weight than user B (i.e. user A must indicate approval several more times than user B to have the same effect). If user B only indicates approval of items once a week, despite frequent consumption of content items, indicating approval of an item is more significant.

In one embodiment, the training model 312 tracks data from the logs for a week, a month, two months, a year, etc. In another embodiment, the training model 312 keeps trends of behavior according to a time of day, a day of the week, holidays, etc. and discards the rest of the data after a predetermined period of time. Trends are tracked because people act differently at certain times, such as around the holidays, on Fridays, etc. In yet another embodiment, the training model 312 gives special consideration to recent activity. This allows the system to identify recent trends, such as a user that is interested in a new artist. By giving recent activity priority, the user receives more content items about recent interests than if they were weighted equally in the model.

Scoring Engine 211

Figure 3C:
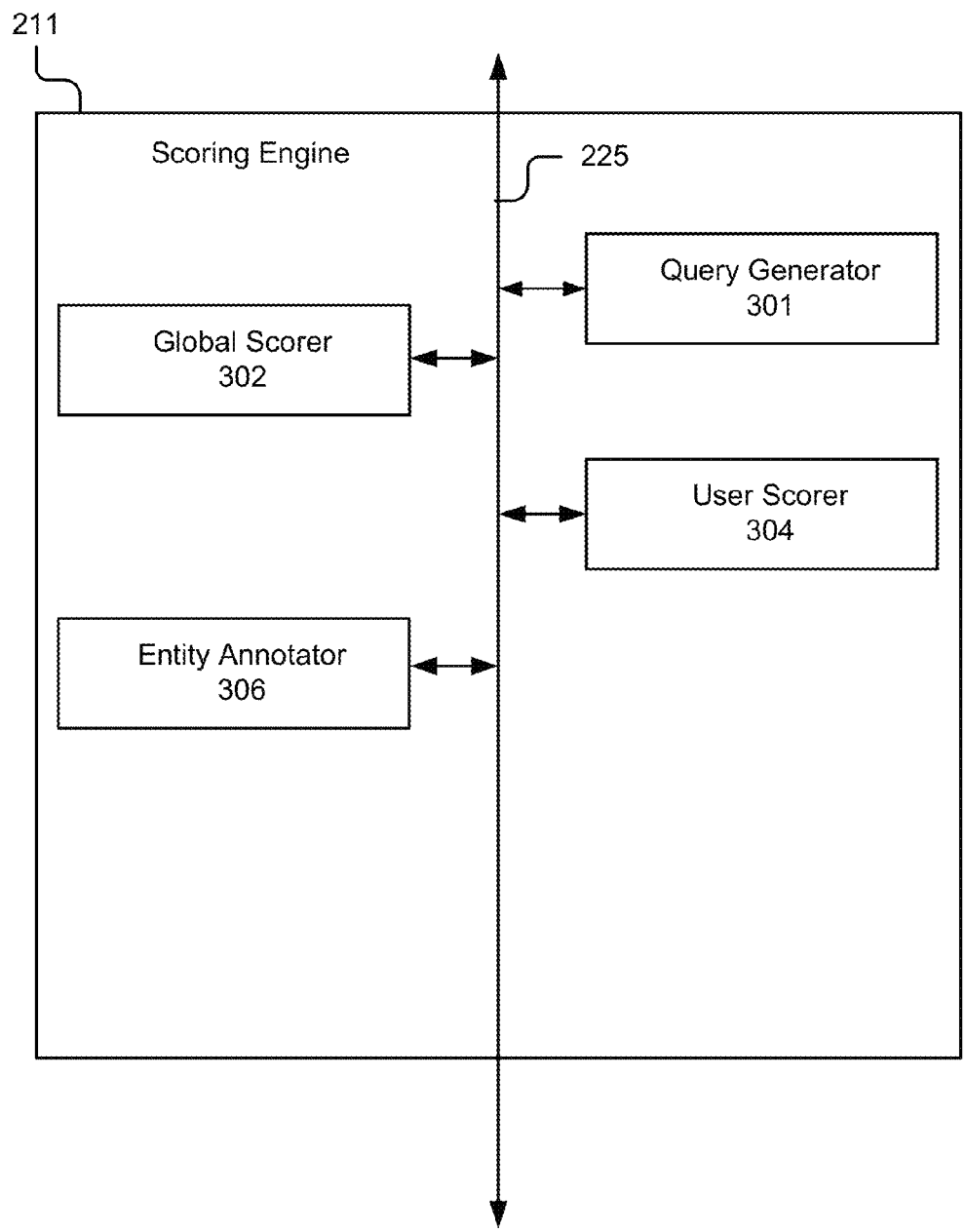
FIG. 3C is a block diagram of one embodiment of the scoring engine in more detail.

Referring now to FIG. 3C, one embodiment of a scoring engine 211 is shown in more detail. The scoring engine 211 includes a query generator 301, a global scorer 302, a user scorer 304 and an entity annotator 306 that are each coupled to signal line 225.

The global scorer 302 is used to rank all content items that are stored in the data storage server 265 or memory 237 (depending upon the embodiment). The global scorer 302 uses signals from the different verticals and log data to compute a global user-independent score for each content item to approximate its popularity or importance within the stream that produced it. The global scorer 302 normalizes the score across streams so that items from various streams are comparable to aid in generating a quick yet reasonable ranking of items. The global score is a combination of its quality specific to the source stream (depending on the rank of the source, number of known followers of a source, etc.) and its global popularity (trigger rate on universal search, relevance to trending queries, number of clicks, long clicks received, etc.).

The global scorer 302 transmits the global score to storage where it is associated with the content item. The global score helps rank the content items for faster retrieval. For example, if the query generated by the query generator 301 includes a request for the top ten items about skiing, those items are already organized in the data storage server 265 or memory 237 according to the global score.

The query generator 301 generates a query for users that would find a content item interesting. There are two types of queries: the first suggests users based on their interest in the item and the second suggests users based on their social connection to the item.

For an interest based query, a candidate content item must be interesting to the user and must exceed a quality threshold based on the user's interest. The quality threshold contains components covering the global quality of the item, and the quality with respect to the user's location, as well as optionally a set of additional quality scores such as the burstiness and geo-burstiness of the item. Burstiness refers to the extent to which the item's popularity has sharply increased. Geo-burstiness refers to the extent to which the item's popularity has sharply increased in a specific geographic area.

The following is one form of the query associated with a user: ((llama_farming AND (global_score>80 OR local_score>10 OR burstiness>15)) OR (from_techwebsite AND (global_score>150 OR local_score>15 OR burstiness>8)) OR ( . . . ). The user may be moderately interested in llama farming and good material on this subject may be hard to come by, yielding a relatively low threshold on global score and the other scores. The user is less interested in content from the technology website and this content is higher in both volume and quality, so the resulting threshold is higher to gate the technology website content to an appropriate flow rate. These thresholds are recomputed nightly based on the activity during the day.

For the social based query, consider the following two example use cases. First, a user comments on a news item and the content item becomes interesting to the user's friend. Second, a video arrives in the system and social server 270 determines that the sister of the video's uploader will be interested in the content contained in the video. In the first use case, an existing news item propagates through the streams of content of all friends that are linked together. The users are passed to the scoring engine 211 as pre-computed candidate users and need not be analyzed by the user scorer 304. This allows the scoring engine 211 to respond in real-time to updates to the social graph 179. The second use case involves social connections that are not explicit to the social network memberships. These social connections are the responsibility of the scoring engine 211. When an item arrives with metadata about the author and any other users that are associated with the item, the query generator 301 queries the social graph 179 to determine whether any candidates from the social graph are interested in the item. If so, the candidate user will be added and decorated with information about the nature of the relationships that makes this user a candidate for the item.

The query is transmitted to the social graph 179 and users matching the query are returned to the scoring engine 211. The user scorer 304 receives the candidate content items from heterogeneous data sources through the content acquisition pipeline 250 or the data storage server 265 and receives the list of users associated with the candidate content items from the query generator 301. In one embodiment, the user scorer 304 receives candidate content items directly from the source, for example, from a microblog. The user scorer 304 then computes a score for a single user and item pair based on the model, including user preferences for various types of content items, including suitable multipliers for the scoring model and the complete description of the item, including the entities it refers to, its various popularity signals (global and geo-specific popularity, both in absolute terms as well as in the rise in popularity).

In one embodiment, the user scorer 304 generates an activity identification, a user identification, an action type (e.g. recommend candidate content item for stream of content), a score, a score version, a score timestamp, a stream type (e.g. YouTube, feed, news, etc.), a stream source (e.g. a magazine, a university, etc.) and a bloom filter.

In one embodiment, the user scorer 304 employs a probabilistic method that evaluates the probability that an item will be present in a user's stream. The random variables used to compute this probability is the lattice of various subsets of properties (entities, global and local scores, source type, source, etc.) shared between the item and the user. For a suitably rich set A of attributes, the random variable "item" is independent of the random variable "user," given the values of the attributes A. Thus for any setting {A=a} of the attributes, Pr(item|A=a, user)=Pr(item|A=a). Therefore, summing over all possible values a of A, obtains $$Pr(\text{item} | \text{user}) = \sum_{p} Pr(\text{item} | p) Pr(p | \text{user}),$$

where p is a property, that is, a setting A=a of the attributes. The latter quantity, Pr(p|user), is something we can approximate from the user's history of interactions with content items as well as user search history and other opt-in data. Similarly, the former quantity, Pr(item|p) is something we can approximate by the (suitably weighted) reciprocal of the number of items with property p (e.g. if it is expected that p=(llama_farming AND (global_score>80 OR local_score>10 OR burstiness>15) to generate 300 items, take Pr(item|p) to be 1/300).

The difficulty of computing Pr(item|user) by the sum above is that the properties expressed in the query corresponding to the user are not independent, and may have correlations to take advantage of To support this, the user scorer 304 begins with very simple approximations of the following form as a first step:

$$Pr(\text{item} | \text{user}) = G^{-1} \left( \sum_{p} G(Pr(\text{item} | p) Pr(p | \text{user})) \right),$$

Pr(p|user))), where the properties p are summed over single-attribute properties (as opposed to all possible settings of an entire collection of attributes), and G is an exponential function of the form $G(x)=2^{(100 \cdot x)}$, so that when applied in this form, if there are several values of p for which Pr(item|p) Pr(p|user) is large, the sum of their G-values slowly increases.

Referring back to FIG. 3C, the entity annotator 306 generates descriptions for each content item. In one embodiment, the entity annotator 306 generates a description for all content items that are stored in the data storage server 265 in association with the content item. In another embodiment, the entity annotator 306 generates an explanation (i.e. a property) for why items were included in the stream of content based on the user's interests. The most important explanations are social (your friend liked/shared/commented on this), entities (because you like monster trucks), queries (because you search for/are interested in [P-38 lightning model airplanes]) and geographic. In one embodiment, the entity annotator 306 incorporates collaborative explanations (because people from a university/Google/etc. liked this) and some named collaborative explanations (because your brother likes a comic).

The entity annotator 306 also generates a feedback mechanism that is displayed with the explanation, such as like or dislike; approve or disapprove, etc. In another embodiment, the explanation is displayed as a decision tree from a broad subject area to narrower subject areas.

The stream of content is displayed in a user interface that allows the user to share the item with friends, comment on the item, save the item, etc. By sharing the content items with friends, the stream of content is circulated throughout the social network. In one embodiment, the scoring engine 211 automatically distributes content items to friends based on a determined commonality, such as sharing pictures of the user's friends with all family members. As a result, a user's stream becomes a combination of information retrieved from websites and content obtained through friends. This keeps the content interesting and the results fresh.

When a user responds to the explanation by providing feedback, the feedback is transmitted to the model generation engine 207 for incorporation into the model. The feedback loop establishes a dynamic model, which is important for two reasons. First, feedback helps train the model when generating the model for the first time. The model is created in part from inferences and these inferences can be wrong. Feedback helps create the most accurate model possible. Second, peoples' interests change and incorporating the feedback makes the model evolve to reflect those changes. For example, a user's taste in music changes such that the user is interested in a particular artist now because she's new but eventually the user will become bored of her music or find better artists. As a result, there will be a point where the user is no longer interested in seeing content items about that particular artist. Incorporating user feedback into the model therefore makes the model stay relevant to the user.

User Interface Engine 260

Figure 4:
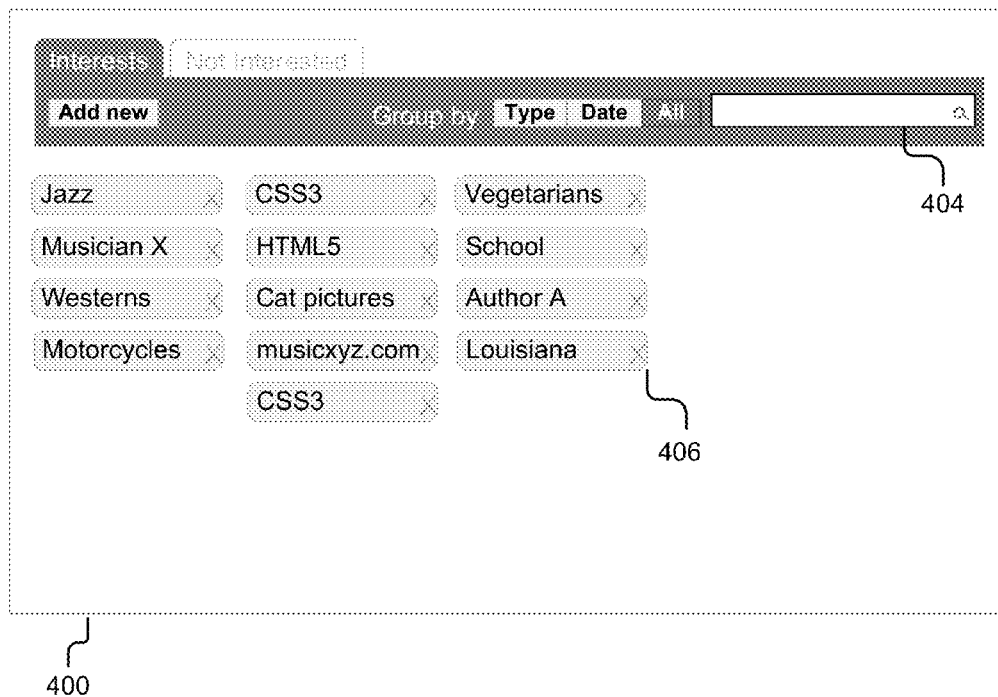
FIG. 4 is a graphic representation of a user interface that is generated by the user interface engine for the user to provide explicit interests.

Turning now to the user interface engine 260, FIG. 4 is a graphic representation 400 of a user interface that is generated by the user interface engine 260 for the user to provide explicit interests. In this example the user can add new interests by inputting words into the search box 404, selecting the search icon and selecting the resulting word. To remove the interests, the user selects the "x" in the icon 406.

Methods

Figure 5:
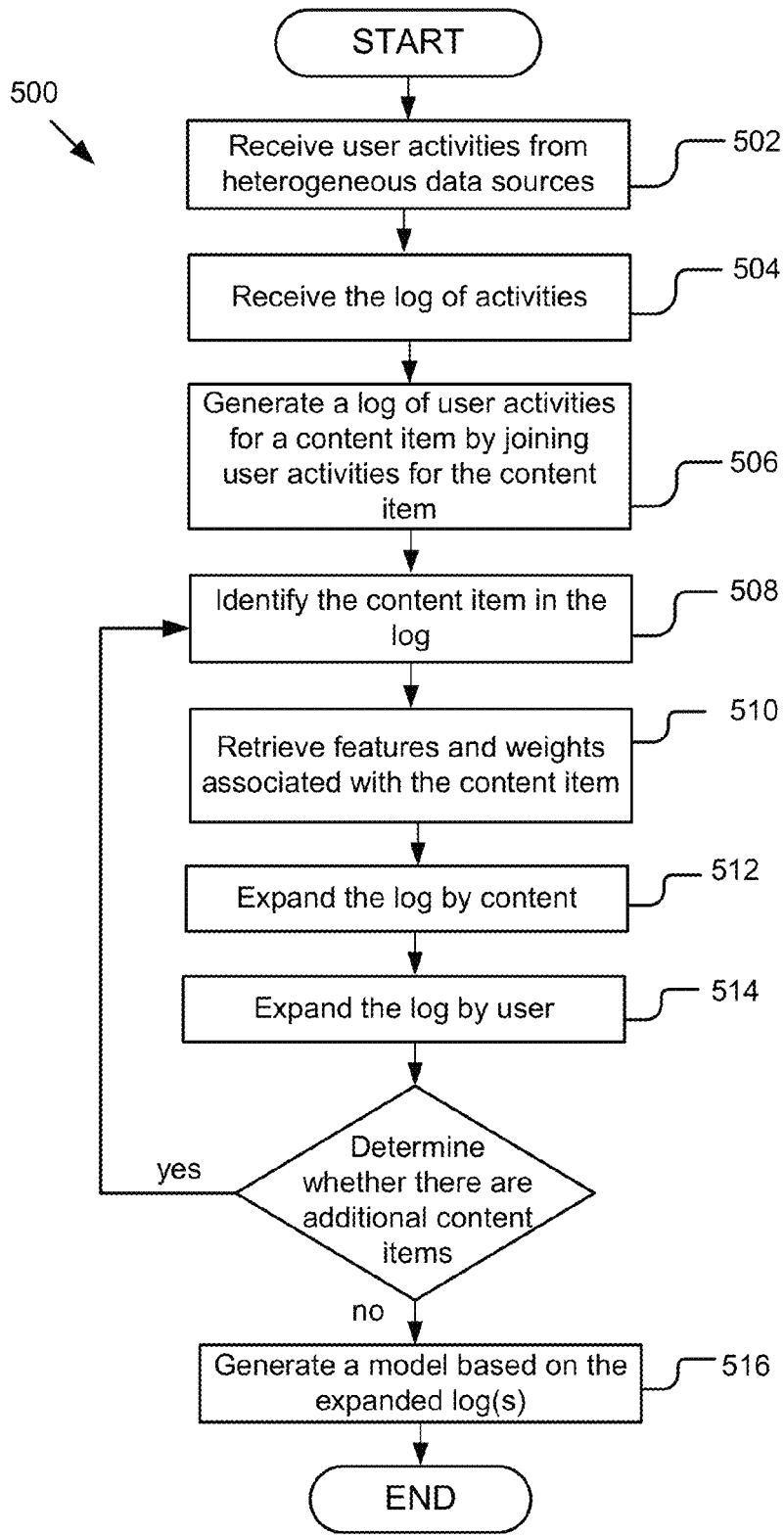
FIG. 5 is a flow diagram of one embodiment of a method for generating a model.
Figure 6:
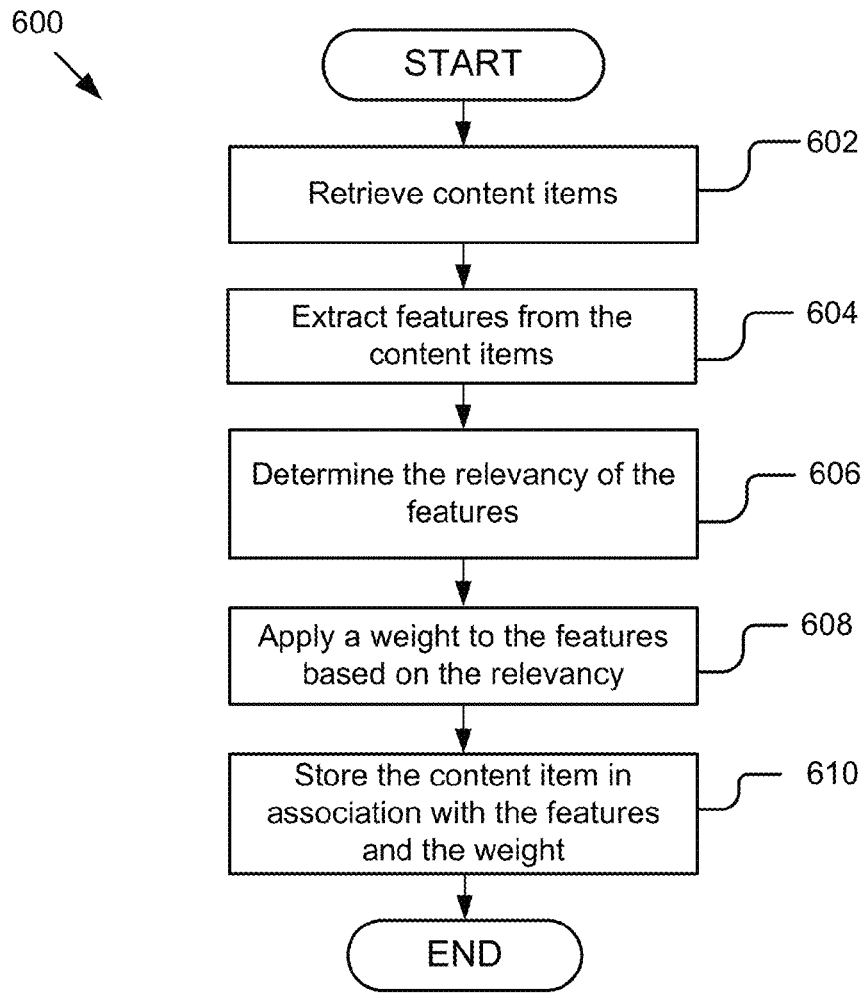
FIG. 6 is a flow diagram of one embodiment of a method for extracting features from content items.
Figure 7:
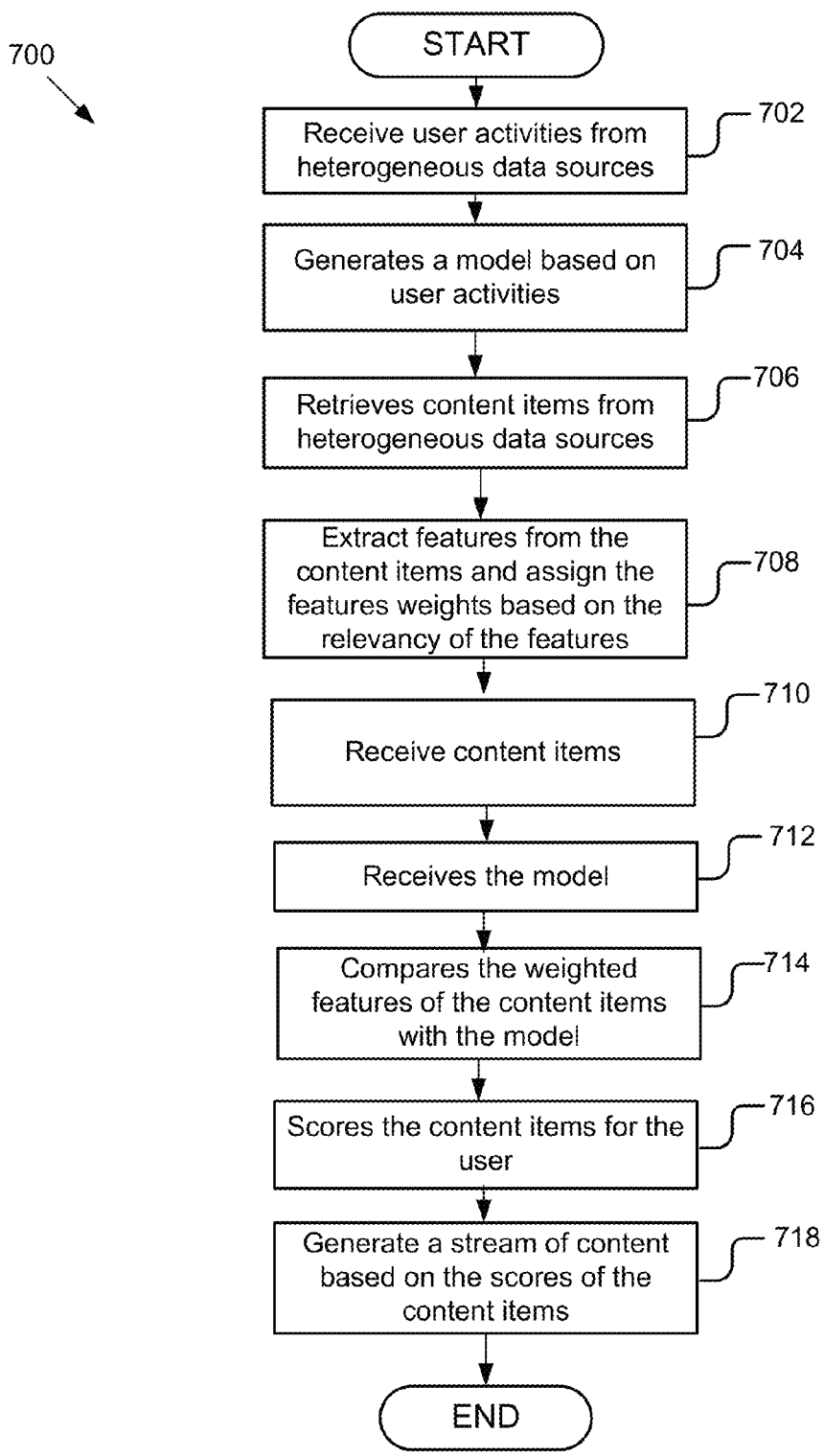
FIG. 7 is a flow diagram of one embodiment of a method for generating a stream of content.

Referring now to FIGS. 5-7, various embodiments of the methods of the specification will be described. FIG. 5 is a flow diagram 500 of one embodiment of a method for generating a model. The logging unit 202 receives 502 user activities from heterogeneous data sources such as a search server 135, an entertainment server 137, a ratings server 139, an email server 141 and, in one embodiment, a social server 270. The logging unit 202 transmits the log to the model generation engine 207 for analysis.

The model generation engine 207 receives 504 the log of all user activities and generates 506 a log of user activities for each content item by joining user activities for the content item. The log contains, for example, the time at which an activity occurred, the activity and an identity of the content item associated with the activity. For example, the content item is displayed in a stream of content, the user views the item, several minutes later the user indicates approval of the item, an hour later the user shares the item with another friend.

The model generation engine identifies 508 the content item in the log and retrieves 510 features and weights associated with the content item from the log. The features and weights are retrieved from memory 237 or a data storage server 265, depending upon the embodiment. The model generation engine 207 expands 512 the log by content by associating the user's activities with the features of the content item. For example, the user is interested in videos about mountain biking that also feature competitive biking. More specifically, the user's responses to content items are aggregated for each feature.

The model generation engine 207 expands 514 the log by the user by identifying characteristics of the user and associating the characteristics of the user with the features and weights associated with the content item. For example, 20 year old males from New Mexico enjoy the content item in question. The model generation engine 207 determines whether there are additional content items. If there are, the process is repeated starting at step 508. If the log for all content items has been created and expanded, the model generation engine 207 generates 516 a model based on the expanded log. By creating a model of user activity that measures a user's interest in known features, the model accurately predicts user reactions to content items with those features and similar features.

FIG. 6 is a flow diagram 600 of a method for extracting features from content items. The feature extractor 213 receives content items from heterogeneous data sources such as a search server 135, an entertainment server 137, a ratings server 139, an email server 141 and, in one embodiment, a social server 270. The feature extractor 213 extracts 604 features from the content items. Features include the topic of the article, a geographic location, people listed in the article, etc. The feature extractor 213 determines 606 the relevancy of the features. For example, a word appearing in the title is more likely to be topical than a word appearing in the middle of the article. The feature extractor 213 applies 608 a weight to the features based on the relevancy. Thus, a word such as "yoga" in an article titled "The Ramifications of Buying an Adjustable Bed" will be weights to have less impact than a mattress feature.

FIG. 7 is a flow diagram 700 of one embodiment of a method for generating a content stream. The logging unit 202 receives user activities from heterogeneous data sources. The logging unit 202 transmits the user activities to the model generation engine 207. The model generation engine 207 generates 704 a model based on the user activities. The feature extractor 213 retrieves 706 content items from heterogeneous data sources. The feature extractor 213 extracts 708 features from the content items and assigns the features weights based on the relevancy of the features.

A scoring engine 211 requests the content items, for example, by submitting a query for content items that match the user's interests. The scoring engine 211 receives 710 the content items from the feature extractor 213, a data storage server 265 or memory 237. The scoring engine 211 receives 712 the model from the model generation engine 207. The scoring engine 211 compares 714 the features and weights of the content items with the model and scores 716 the content items for the users. So, for example, a content item with a weighted feature corresponding to mountain biking receives a higher score than a content item with a weighted feature corresponding to knitting. The scoring engine 211 then generates 718 a stream of content based on the scores of the content items.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for generating a model of a user, the method comprising:
   generating global scores for content items from heterogeneous data sources that are normalized for the heterogeneous data sources;
   receiving user activities on a social network server for the user, the user activities relating to at least one of the content items;
   generating a log of the user activities for a content item by joining the user activities for the content item;
   expanding attributes of the log by at least one of content and the user based on aggregating responses from the user to features of the content items and profile data of the user and associating the features of the content items with the profile data;
   generating an expanded log based on expanding the attributes of the log;
   generating the model based on the expanded log;
   identifying candidate items for the user based on the global scores for the content items;
   generating a stream of content comprising selected items based on the candidate items and the model;
   providing an explanation for why a selected item is included in the stream of content, the explanation including a user interest associated with the selected item;
   generating a feedback mechanism for display with the explanation;
   receiving a user's rejection of the user interest through the feedback mechanism;
   training the model using the user's rejection to the user interest and the user's recent activity that identifies a recent interest for the user; and
   dynamically updating the model based on training the model.

2. The method of claim 1, further comprising determining whether there are additional content items and wherein generating the log, expanding the attributes of the log, and generating the model are based on a presence of the additional content items.

3. The method of claim 1, further comprising:
   identifying the content items in the log;
   retrieving the features associated with the content items; and
   wherein the responses from the user are aggregated to the retrieved features.

4. The method of claim 1, wherein expanding the attributes of the log by the user comprises:
   identifying the content item in the log;
   retrieving features and weights associated with the content item;
   identifying characteristics of the user; and associating the characteristics of the user with the features and weights associated with the content item.

5. The method of claim 1, further comprising:
receiving the content items;
extracting the features from the content items;
determining relevancy of the features; and
applying a weight to the features based on the relevancy to form weighted features.

6. The method of claim 5, further comprising:
comparing the weighted features to the model; and
scoring the content items for the user.

7. The method of claim 1, further comprising receiving a query for the content that the user would find interesting and wherein identifying the candidate items is based on a global_score for each candidate item exceeding a threshold.

8. The method of claim 6, wherein scoring the content items includes predicting at least one of a positive reaction and a negative reaction from the user.

9. The method of claim 8, wherein the positive and negative reactions include at least one of a likelihood to click the content item, hide the content item, comment on the content item, pass, click, approve of the content item, reshare the content item, remove the content item, retrieve the content item and save the content item.

10. A system for generating a model of a user comprising:
a logging unit for receiving user activities on a social network server for the user, the user activities relating to at least one of content items and generating a log of the user activities;
a model generation engine coupled to the logging unit, the model generation engine receiving the log of the user activities for a content item, joining the user activities for the content item, expanding attributes of the log by at least one of content and the user based on aggregating responses from the user to features of the content items and profile data of the user and associating the features of the content items with the profile data, generating an expanded log based on expanding the attributes of the log, generating the model based on the expanded log, training the model using a user's rejection to a user interest and the user's recent activity that identifies a recent interest for the user and dynamically updating the model based on training the model; and
a scoring engine for generating global scores for the content items from heterogeneous data sources that are normalized for the heterogeneous data sources, identifying candidate items for the user based on the global scores for the content items, generating a stream of content comprising selected items based on the candidate items and the model, providing an explanation for why a selected item is included in the stream of content, the explanation including the user interest associated with the selected item, generating a feedback mechanism for display with the explanation, and receiving the user's rejection of the user interest through the feedback mechanism.

11. The system of claim 10, wherein the model generation engine determines whether there are additional content items and wherein generating the log, expanding the attributes of the log and generating the model are based on a presence of the additional content items.

12. The system of claim 10, wherein the model generation engine identifies the content items in the log, retrieves the features associated with the content items and aggregates the responses from the user to the retrieved features.

13. The system of claim 10, wherein the model generation engine expands the attributes of the log by the user including identifying the content item in the log, retrieving features and weights associated with the content item, identifying characteristics of the user and associating the characteristics of the user with the features and weights associated with the content item.

14. The system of claim 10, further comprising a feature extractor receiving the content items, extracting the features from the content items, determining relevancy of the features and applying a weight to the features based on the relevancy to form weighted features.

15. The system of claim 14, wherein the scoring engine receives the weighted features from the feature extractor and the model from the model generation engine, the scoring engine comparing the weighted features to the model and scoring the content items for the user.

16. The system of claim 10, wherein the scoring engine receives a query for the content that the user would find interesting and wherein identifying the candidate items is based on a global score for each candidate item exceeding a threshold.

17. The system of claim 15, wherein the scoring engine scores the content items by predicting at least one of a positive reaction and a negative reaction from the user.

18. The system of claim 17, wherein the positive and negative reactions include at least one of a likelihood to click the content item, hide the content item, comment on the content item, pass, click, approve of the content item, reshare the content item, remove the content item, retrieve the content item and save the content item.

19. A computer program product comprising a non-transitory computer useable medium including a computer readable program, wherein the computer readable program when executed on a computer causes the computer to:
generate global scores for content items from heterogeneous data sources that are normalized for the heterogeneous data sources;
receive user activities on a social network server for a user, the user activities relating to at least one of the content items;
generate a log of the user activities for a content item by joining the user activities for the content item;
expand attributes of the log by at least one of content and by the user based on aggregating responses from the user to features of the content items and profile data of the user and associating the features of the content items with the profile data;
generate an expanded log based on expanding the attributes of the log;
generate a model based on the expanded log;
identify candidate items for the user based on the global scores for the content items;
generate a stream of content comprising selected items based on the candidate items and the model;
provide an explanation for why a selected item is included in the stream of content, the explanation including a user interest associated with the selected item;
generate a feedback mechanism for display with the explanation;
receive a user's rejection of the user interest through the feedback mechanism;
train the model using the user's rejection to the user interest and the user's recent activity that identifies a recent interest for the user; and
dynamically update the model based on training the model.

20. The computer program product of claim 19, wherein the computer readable program when executed on the computer causes the computer to:

receive the content items;
extract the features from the content items;
determine relevancy of the features; and
apply a weight to the features based on the relevancy to form weighted features.

* * * * *